US006208332B1

(12) United States Patent
Ikegami

(10) Patent No.: US 6,208,332 B1
(45) Date of Patent: Mar. 27, 2001

(54) RESISTANCE FILM TABLET SYSTEM CAPABLE OF RAPIDLY DETECTING A POSITION OF CONTACT AND METHOD OF CONTROLLING THE SAME

(75) Inventor: Yoshikazu Ikegami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/156,067

(22) Filed: Sep. 17, 1998

(30) Foreign Application Priority Data

Sep. 17, 1997  (JP) .................................................. 9-251212

(51) Int. Cl.[7] ............................... G09G 5/00; G06K 11/16
(52) U.S. Cl. ......................................... 345/174; 178/18.05
(58) Field of Search ................................... 345/173, 174, 345/179; 178/18.01, 18.03, 18.05, 18.06, 20.01, 20.03; 341/22, 33, 34

(56) References Cited

U.S. PATENT DOCUMENTS

| 4,575,580 | * | 3/1986 | Jandrell | 178/18.05 |
| 4,929,934 | * | 5/1990 | Ueda et al. | 345/174 |
| 5,225,636 | * | 7/1993 | Protheroe | 178/18.05 |
| 5,327,163 | * | 7/1994 | Hashimoto et al. | 345/173 |
| 5,432,304 | * | 7/1995 | Tanahashi | 178/18.02 |
| 5,496,974 | * | 3/1996 | Akebi et al. | 178/18.05 |
| 5,550,329 | * | 8/1996 | Matsubayashi | 345/173 |
| 5,589,857 | * | 12/1996 | Tanahashi et al. | 345/174 |
| 5,767,458 | * | 6/1998 | Koolen | 345/174 |
| 5,818,430 | * | 10/1998 | Heiser | 345/174 |
| 5,831,599 | * | 11/1998 | Inoue | 345/173 |
| 5,854,451 | * | 12/1998 | Miyazaki et al. | 178/18.05 |
| 5,872,561 | * | 2/1999 | Figie et al. | 341/22 |

* cited by examiner

Primary Examiner—Steven J. Saras
Assistant Examiner—Paul A. Bell

(57) ABSTRACT

In a resistance film tablet system which includes a pair of resistance films superposed on each other and spaced by a predetermined distance therebetween, a value measured at the previous detection is stored in a memory beforehand and is read out for being converted into an analog voltage, then, a capacitance portion of the resistance films is charged with the voltage. The capacitance portion is converged to its convergent value faster, thereby a faster sampling can be operated. It is therefore possible to scan a resistance film tablet system faster by shortening a waiting time after a necessary mode setting, when measuring a voltage at a contact point in X-detection or Y-detection mode.

11 Claims, 6 Drawing Sheets

RESISTANCE FILM TABLET SYSTEM CAPABLE OF RAPIDLY DETECTING A POSITION OF CONTACT AND METHOD OF CONTROLLING THE SAME

BACKGROUND OF THE INVENTION

The present invention relates to a resistance film tablet system and a method of controlling the resistance film tablet system, and particularly to a resistance film tablet system comprising two resistance films superposed on each other and spaced by a predetermined distance therebetween and a method of controlling the resistance film tablet system.

Conventionally, a resistance film tablet system is composed of two resistance films which have resistance values equal to each other and each of which has parallel electrodes at both ends thereof. The two resistance films are then faced to each other to have a space of a predetermined distance therebetween with their directions shifted by 90 degrees from each other. With this structure, when the two resistance films are pressed from outside by a tapered tip like a pen tip and so on, the two resistance films are arranged to come into contact with each other at the pressed point.

Regarding the four parallel electrodes of such a tablet, it is known that a physical position of the contact point of the two resistance films can be measured by using the following scanning modes.

As will later be described more in detail, the conventional resistance film tablet system is subjected to the following basic scanning modes. Namely, the modes consist of "contact detection" to check whether or not the two resistance films are in contact with each other, "X-detection" to check a position in the direction of X, and "Y-detection" to check a position in the direction of Y. And, these detecting modes or operations are sequentially repeated until the two resistance films are judged as being not in contact with each other in the "contact detection" mode.

In addition, it is a recent trend that a faster sampling is required from demands for a character recognition with a normal writing speed, etc.

However, when users measure contact point voltages by the X-detection and the Y-detection modes in the conventional resistance film tablet system, they have to wait a certain period of time due to a change of a mode. Thereby, sampling is substantially restricted. In other words, when contact point voltages are measured by the X-detection and the Y-detection, tablet scanning of the conventional resistance film tablet system has a drawback that users have to wait a certain period of time after a mode is set.

SUMMARY OF THE INVENTION

It is therefore an object of the present invention to provide a resistance film tablet system which is capable of carrying out a sampling faster than the conventional resistance film tablet system and a control method therefor by shortening the aforesaid waiting time.

Other objects of the present invention will become clear as the description proceeds.

On describing the gist of the present invention, it is readily understood that a resistance film tablet system is composed of two resistance films superposed on each other and spaced by a predetermined distance therebetween.

According to an aspect of the present invention, there is provided a resistance film tablet system which includes a pair of resistance films superposed on each other and spaced by a predetermined distance therebetween, comprising: contact detection means for detecting that a pair of resistance films are in contact with each other at a contact point; charging means for charging a capacitance between a pair of resistance films in response to the detection; and detection means for detecting a position in a first direction and a position in a second direction orthogonal to the first direction regarding the contact point of a pair of resistance films after the charging.

A pair of resistance films may be both rectangular resistance films with uniform resistance value and may be constituted so as to be superposed on each other with parallel electrodes provided on the opposing sides of the rectangles mutually shifted by 90 degrees.

A pair of resistance films may be both rectangular resistance films with uniform resistance value and the first direction may be along one side of the rectangle and the second direction may be along the other side of the rectangle. The charging means may comprise a memory for storing position data regarding the position in the first direction and the position in the second direction detected by the detection means, and voltage impression means for impressing a voltage corresponding to the position data stored in the memory across a pair of resistance films.

The position data may be stored in the memory after converting them into digital data.

The charging means may charge the capacitance in accordance with a signal after the data read from the memory has been transformed into analog data.

According to another aspect of the present invention, there is also provided a method of controlling a resistance film tablet system composed of a pair of resistance films superposed on each other and spaced by a predetermined distance therebetween, comprising the steps of; detecting a contact state between a pair of resistance films; charging a capacitance between a pair of resistance films in response to the detection of the contact state; and detecting a position in a first direction and a position in a second direction orthogonal to the first direction regarding the contact point of a pair of resistance films after the charging.

A pair of resistance films may be both rectangular resistance films with uniform resistance value and may be constituted so as to be superposed on each other with parallel electrodes provided on the opposing sides of the rectangles mutually shifted by 90 degrees.

A pair of resistance films may be both rectangular resistance films with uniform resistance value and the first direction may be along one side of the rectangle and the second direction may be along the other side of the rectangle. The charging step may comprise a step of impressing a voltage corresponding to the position data stored in the memory storing the position data regarding the position in the first direction and the position in the second direction detected by the position detection step between a pair of resistance films.

According to yet another aspect of the present invention, there is further provided a recording medium for storing a computer program to achieve a method of controlling a resistance film tablet system composed of a pair of resistance films superposed on each other and spaced by a predetermined distance therebetween, wherein the computer program makes a computer detect a contact state between a pair of resistance films, and charge a capacitance between a pair of resistance films in response to the detection of a contact state, and detect a position in a first direction and a position in a second direction orthogonal to the first direction regarding the contact point of a pair of resistance films after the charging.

DETAILED DESCRIPTION OF THE PREFERRED EMBODIMENT

Figure 1:
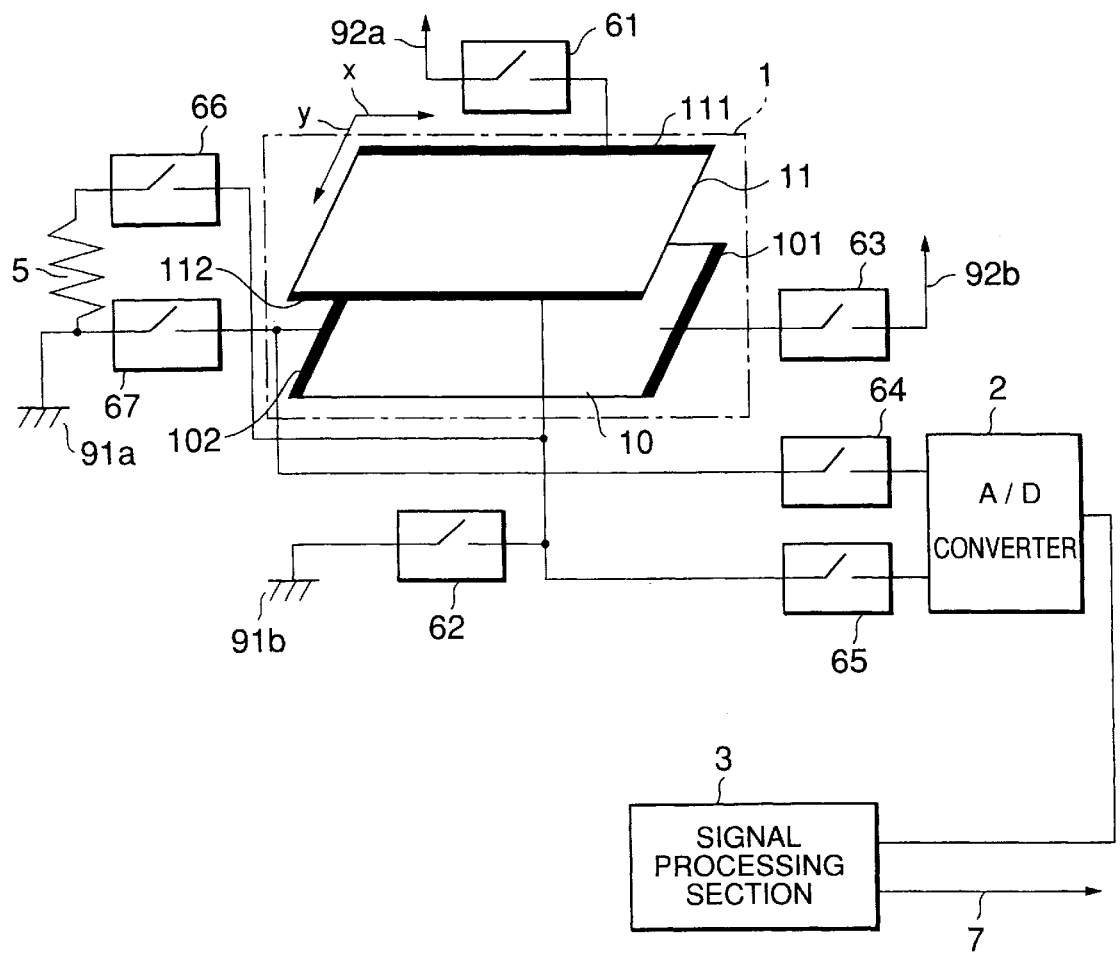
FIG. 1 is a block diagram for showing a constitution of a conventional resistance film tablet system.
Figure 2:
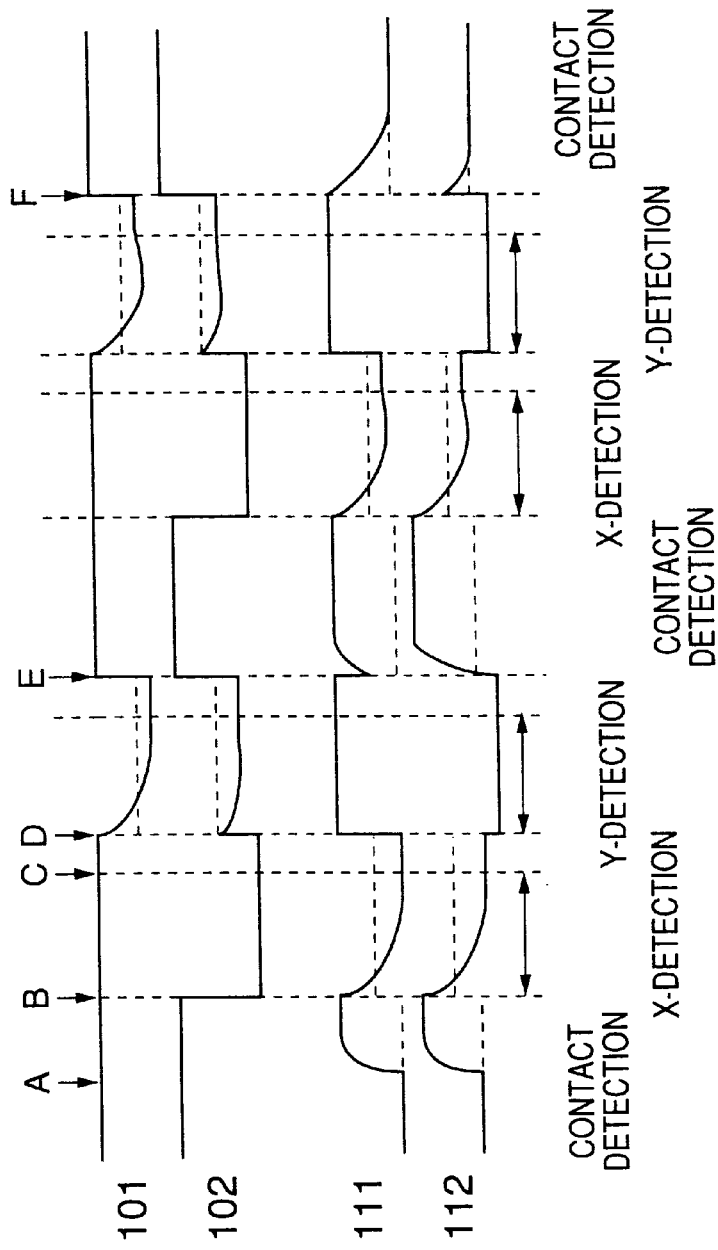
FIG. 2 is a timing chart for showing operations of the conventional resistance film tablet system illustrated in FIG. 1.

Referring to FIGS. 1 and 2, description is, at first made about a conventional resistance film tablet system and a method of controlling the resistance film tablet system in order to facilitate an understanding of the present invention. FIG. 1 is a schematic block diagram for showing the conventional resistance film tablet system while FIG. 2 is a timing chart for showing the sequentially repeated detecting operations of the above-mentioned contact detection, the X-detection and the Y-detection.

First, composition of the conventional resistance film tablet system is described hereinunder.

A tablet input section 1 shown in FIG. 1 is composed of two resistance films 10 and 11 superposed on each other. Further, the resistance film 10 is provided with parallel electrodes 101 and 102 while the resistance film 11 is provided with parallel electrodes 111 and 112. The resistance films 10 and 11 are brought into contact with each other at a point when they are pressed with a tapered tip like a pen tip from outside. As a result, the resistance films 10 and 11 are electrically connected to each other through the point.

In the interim, connections to be routed for the parallel electrodes 101, 102, 111, and 112 attached to both ends of the resistance films 10 and 11 are arranged to be changeable by electronic switches 61 to 67. The parallel electrode 101 is arranged to be connectable with a power supply 92b by the electronic switch 63. On the other hand, the parallel electrode 102 is arranged to be independently connectable with the ground 91a by the electronic switch 67 and with an A/D converter (analog/digital converter) 2 for voltage measurement by the electronic switch 64, respectively.

The parallel electrode 111 is arranged to be connectable with a power supply 92a by the electronic switch 61. On the other hand, the parallel electrode 112 is arranged to be independently connectable with the ground 91b by the electronic switch 62, with the A/D converter 2 by the electronic switch 65, and with a pull-down resistor 5 by the electronic switch 66, respectively.

The electronic switches 61 to 67 are controlled by a signal processing section 8. The signal processing section 3, when necessary, controls connection states of each electronic switch, and also changes the detecting operations described above. Further, the signal processing section 3 measures a voltage across the parallel electrodes by the A/D converter 2 at a required timing, and outputs the results as measured data 7.

Next, the connection states of the parallel electrodes for each detecting operation will be described below. Besides, in FIG. 1, the aforesaid direction of X in the X-detection and the direction of Y in the Y-detection are shown by X axis and Y axis of a two-dimensional coordinates, respectively. The X axis is directed righthand end of a sheet of FIG. 1 while the Y axis is directed substantially downward of the sheet of FIG. 1.

Firstly, in a case of the contact detection, the parallel electrode 101 is connected with the power supply 92b while the parallel electrodes 102 and 111 are non-connective. Further, the parallel electrode 112 is connected with the pull-down resistor 5 and the A/D converter 2. Secondly, in a case of the X-detection, the parallel electrode 101 is connected with the power supply 92b while the parallel electrode 102 is connected with the ground 91a. Further, the parallel electrode 111 is non-connective while the parallel electrode 112 is connected with the A/D converter 2. Thirdly, in a case of the Y-detection, the parallel electrode 101 is non-connective while the parallel electrode 102 is connected with the A/D converter 2. Further, the parallel electrode 111 is connected with the power supply 92a while the parallel electrode 112 is connected with the ground 91b.

Now, referring to FIG. 2, description proceeds to an operation of each section of the conventional resistance film tablet system illustrated in FIG. 1.

In an example of the scanning method of the conventional resistance film tablet system shown in FIG. 2, it is judged at the second contact detection that the resistance films are not in contact with each other.

Firstly, the signal processing section 3 is normally on standby in a state of contact detection. When the two resistance films are brought into contact by touching with a pen, etc. in this state, electricity is fed to the resistance film 11 from the resistance film 10 to which electricity is supplied from the electrode 101. A voltage value of the resistance film 11 connected with the pull-down resistor 5 and the A/D converter 2 is then boosted by the feeding of electricity from the resistance film 10, as depicted by a point A in FIG. 2.

The signal processing section 3 is monitoring the voltage value of the resistance film 101 through the A/D converter 2. When the voltage value exceeds a fixed value, the signal processing section 3 judges that the film was touched on, and goes to the X-detection, as depicted by a point B in FIG. 2.

In the X-detection, a voltage is not supplied to the resistance film 11 but supplied across the electrodes 101 and 102 on both ends of the resistance film 10. Thus, the resistance film 10 has a voltage proportional to a position in the direction of x-axis in FIG. 1, and the resistance film 11 connected only with the A/D converter 2 as a load outputs a voltage of the point in contact with the resistance film 10, as depicted by a point C in FIG. 2. The signal processing section 3 can detect a voltage (a same voltage as a potential of the contact point) of the electrode 112 through the A/D converter 2. The signal processing section 3 stores this voltage as a value on the x-axis of the contact point, and then operates the Y-detection, as depicted by a point D in FIG. 2.

In the Y-detection, the connections related to the resistance film in the case of the X-detection are reversed. Namely, a voltage is impressed across the electrodes 111 and 112 of both ends of the resistance film 11 while the resistance film 10 is non-connected. It is possible to know the value on the y-axis of the contact point in this manner. The signal processing section 3 stores this value, and operates contact detection again, as depicted by a point E in FIG. 2. When the contact is checked by means of this contact detection, the signal processing section 3 sends out the stored measured values externally as measured data 7 of the tablet.

Further, the signal processing section 3 starts scanning again to sequentially repeat the X-detection, the Y-detection and the contact detection. The signal processing section 3 continues to send out measured values in the repeated X-detection, Y-detection and contact detection as measured data 7. This transmission of the measured data 7 is continued until a contact becomes undetectable at the time of the contact detection. Moreover, if a contact is undetectable, as depicted by a point F in FIG. 2, the signal processing section 3 continues to wait for any contacts in the contact detection state thereof. When a contact is ascertained, the signal processing section 3 restarts scanning.

In addition, in a recent tablet, a faster sampling is required from demands for a character recognition with a normal writing speed, etc.

When users measure contact point voltages by the X-detection and the Y-detection in the conventional tablet described above, they have to wait a certain period of time after the signal processing section 3 sets a mode (Arrow marks from the point B to the point C in FIG. 2). The waiting time indicated by these arrow marks is generated by a delay circuit formed of a CR time constant circuit consisting of a capacitance of the resistance film connected to the A/D converter side and a resistance component of the resistance film supplied with power. Due to this delay circuit, it takes time to move to a detection mode. Thereby, sampling is substantially restricted. In other words, when contact point voltages are measured by the X-detection and the Y-detection, tablet scanning of a resistance film system has a drawback that users have to wait a certain period of time after a mode is set by the signal processing section.

Referring to FIGS. 3 to 6, description will proceed to a resistance film tablet system according to a preferred embodiment of the present invention.

Figure 3:
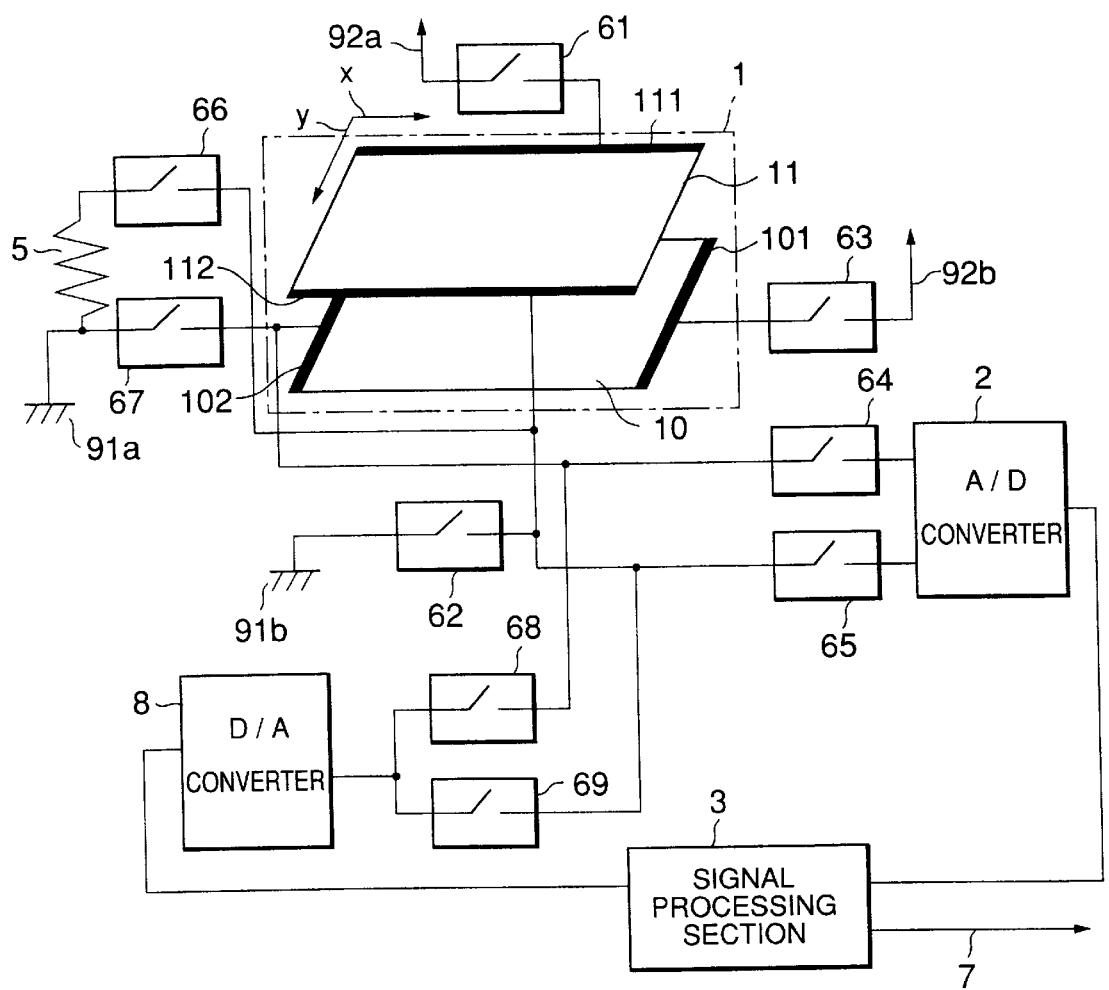
FIG. 3 is a block diagram for showing a constitution of a resistance film tablet system according to a preferred embodiment of the present invention.

FIG. 3 is a block diagram for showing an embodiment of a resistance film tablet system in accordance with the present invention. The resistance film tablet system illustrated in FIG. 3 has portions similar to those of the above-described conventional resistance film tablet system illustrated in FIG. 1. In FIG. 3, the portions similar to those in FIG. 1 are indicated with common markings, and descriptions on the portions are omitted.

In short, as regards scanning a tablet of resistance film system in the preferred embodiment of the present invention, in order for a faster sampling to be carried out by shortening a waiting time after setting a necessary mode at the time of measuring a contact point voltage by the Y-detection, a value measured in the same previous mode is outputted from the D/A converter to the resistance film which has a capacitance portion and is connected to the side of the A/D converter, and charges the capacitance portion to be reduced faster to its convergent value. Thus, the scanning of resistance film system permits to shorten the waiting time after the mode setting necessary for measuring the voltages at the contact points of the X-detection and the Y-detection.

In FIG. 3, an input section 1 of a tablet of resistance film system where users actually input is composed of a sheet of resistance film 10 provided with parallel electrodes 101 and 102 and a sheet of resistance film 11 provided with parallel electrodes 111 and 112 which are superposed on each other. These resistance films face each other with their directions shifted by 90 degrees from each other. When the tablet is externally pressed with a stylus like a pen, the resistance films 10 and 11 are brought into contact with each other at a point, and the contact point has a gap of a level permitting to be conductive. An A/D converter 2 converts position data outputted from the tablet input section 1 as a voltage into a form usable as digital data. A signal processing section 3 controls ON-OFF electronic switches 61 to 69 individually based on the data outputted from the A/D converter. Further, the signal processing section 3 changes the mode of the tablet input section 1. As a result, the signal processing section 3 calculates a contacted position data of the tablet input 1, based on the data outputted from the A/D converter 2, for outputting them as measured data. In addition, the signal processing section 3 is also able to control a D/A converter 8 which can supply a voltage to the tablet input section 1.

A contact detection resistor 5 is used for making the resistance film 11, which is to be connected with the A/D converter 2 for the contact detection, to be of a same potential as the ground for grounding when an operation mode of the tablet input section 1 is changed to the contact detection mode. The electronic switches 61 to 69 are controlled by the signal processing section 3, which can control ON-OFF the connections of the terminal parts connected with the both ends.

Connecting conditions of each part will be described more in details.

The electronic switch 61 can connect the parallel electrode 111 of the resistance film 11 to the power source 92*a* for the tablet input section. The electronic switch 62 can connect the parallel electrode 112 of the resistance film 11 to the ground 91*b* for grounding the tablet input section The electronic switch 63 can connect the parallel electrode 101 of the resistance film 10 to the power source 92*b* for the tablet input section. The electronic switch 64 can connect the parallel electrode 102 of the resistance film 10 with the input section of the A/D converter 2.

The electronic switch 65 can connect the parallel electrode 112 of the resistance film 11 with the A/D converter 2. The electronic switch 66 can connect the contact detection resistor 5 with the parallel electrode 112 of the resistance film 11.

The electronic switch 67 can connect the parallel electrode 102 of the resistance film 10 with the ground 91*a* for grounding. The electronic switch 68 can connect the parallel electrode 102 of the resistance film 10 with the D/A converter 8. The electronic switch 69 can connect the parallel electrode 112 of the resistance film 11 with the D/A converter 8.

The D/A converter 8 outputs the digital data instructed by the signal processing section 3 as analog data. The grounds 91*a* and 91*b* are the grounds for grounding the tablet input section 1. The power sources 92*a* and 92*b* are supply voltages for the tablet input section.

Figure 4:
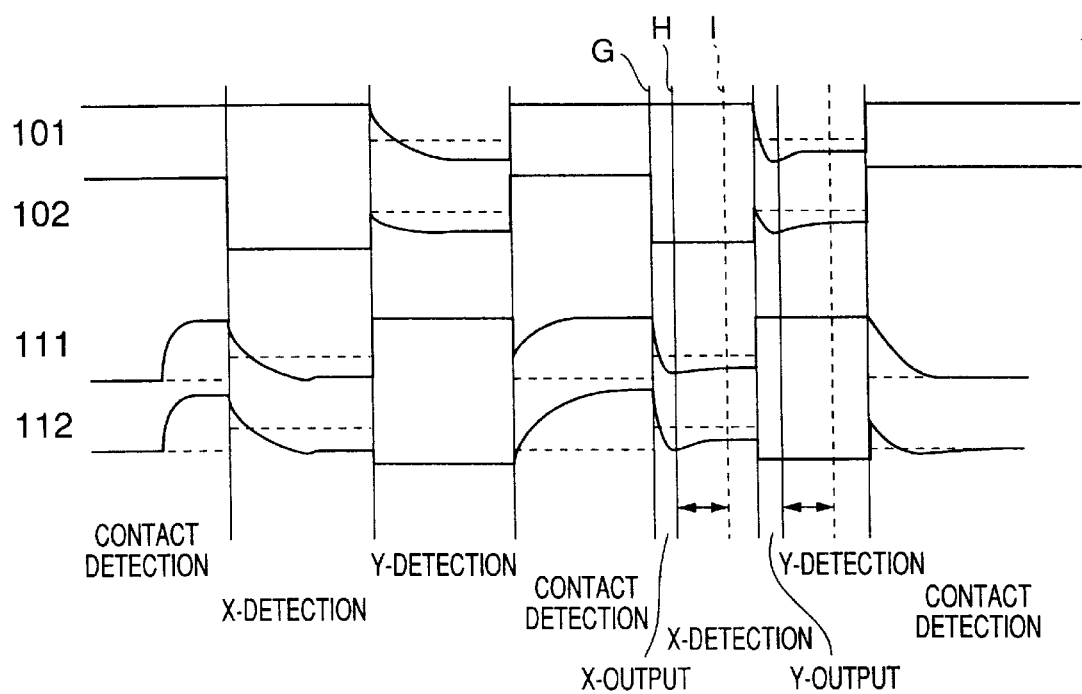
FIG. 4 is a timing chart for showing operations of the resistance film tablet system illustrated in FIG. 3.

In the preferred embodiment of the present invention, the D/A converter outputting measured value in the same previous mode and the electronic switches for connecting the D/A converter with the parallel electrodes of the tablet connected with an A/D converter are added to the aforesaid conventional resistance film tablet system. Further, "X-detection" and "Y-detection" which are output modes of the previous measured values are added to the scanning mode. Therefore, as a fundamental scanning method, "contact detection" for checking whether or not the two resistance films are in contact with each other, "Xdetection" for checking a position in the direction of X, and "Y-detection" for checking a position in the direction of Y are sequentially operated. The scanning operation is stopped when the two resistance films are judged as being not in contact with each other. On the other hand, when the two resistance films are judged as being in contact with each other, "X-output" for outputting a measured value by the previous X-detection, "X-detection", "Y-output" for outputting a measured value by the previous Y-detection, "Y-detection", and "contact detection" are sequentially repeated until non-contact state is detected. FIG. 4 shows an example in which non-contact is judged at the second contact detection.

Each detection method will be described according to the schematic block diagram in FIG. 3 and the timing chart in FIG. 4. To be more specific, the input section 1 of the tablet in FIG. 3 is composed of the resistance film 10 with the parallel electrodes 101, 102 and the resistance film 11 with the parallel electrodes 111, 112 superposed on each other. When the tablet is pressed with a stylus like a pen, the resistance films 10, 11 are brought into contact with each other at a point permitting to be conductive. The parallel electrodes are arranged to be changeable in the connections to be routed by the electronic switches 61 to 69. The parallel electrode 101 can be connected to the power source 92 by the electronic switch 63. The parallel electrode 102 is independently connectable with an output of the D/A converter 8 as well as with the ground 92a and an input of the A/D converter 2. The parallel electrode 111 is connectable with the power source 92. The parallel electrode 112 is connectable with the ground 91b, the A/D converter 2, the contact detection resistor 5 and an output of the D/A converter 6.

Next, the states of the parallel electrodes in each detection mode will be described. In the case of contact detection, the parallel electrode 101 is connected with the power source 92; the parallel electrodes 102 and 111 are non-connective; and the parallel electrode 112 is connected with the contact detection resistor 5 and the A/D converter 2. In the case of the X-detection, the parallel electrode 101 is connected with the power source 92; the parallel electrode 102 is connected with the ground 62; the parallel electrode 111 is non-connective; and the parallel electrode 112 is connected with the A/D converter 2. In the case of the Y-detection, the parallel electrode 101 is non-connective; the parallel electrode 102 is connected with the A/D converter 2; the parallel electrode 111 is connected with the power source 92; and the parallel electrode 112 is connected with the ground 91. As for the X-output, the parallel electrode 101 is connected with the power source 92; the parallel electrode 102 is connected with the ground 91; the parallel electrode 111 is non-connective; and the parallel electrode 112 is connected with the A/D converter 2 and the D/A converter 8, As for the Y-output, the parallel electrode 101 is non-connective; the parallel electrode 102 is connected with the A/D converter 2 and the D/A converter 8; the parallel electrode 111 is connected to the power source 92; and the parallel electrode 112 is connected with the ground 91.

Referring now to FIG. 4 with reference to FIG. 8 continued, description is made as regards operations of the resistance film tablet system according to the preferred embodiment.

The first contact detection, X-detection, and Y-detection are the same as those in an example of prior art. When a contact has been ascertained in the second contact detection, the signal control part goes to X-output mode, as depicted by a point G in FIG. 4, The D/A converter 8 then provides a previously measured voltage to the resistance film 11 connected with the A/D converter 2 having a capacitance for charging the capacitance portion. Next, the signal processing section 3 operates the X-detection, as depicted by a point H in FIG. 4, and waits for a convergence, as depicted by a point I in FIG. 4, of the voltage value of the resistance film 11 before it is measured by the A/D converter. Then, unlike the example of prior art, the voltage value is converged from the previously measured value into an intended value. Normally, since a tablet has a speed of response as fast as that of a hand, there is little difference in the results between the previous measurement and the present measurement. For this reason, a convergent time depicted by arrow marks in FIG. 4 is shorten. And then, the signal processing section 3 interchanges the connections of the resistance films and similarly operates the Y-output and the Y-detection, and the contact detection. If a contact is ascertained through this contact detection, scanning is restarted from the X-output.

Figure 5:
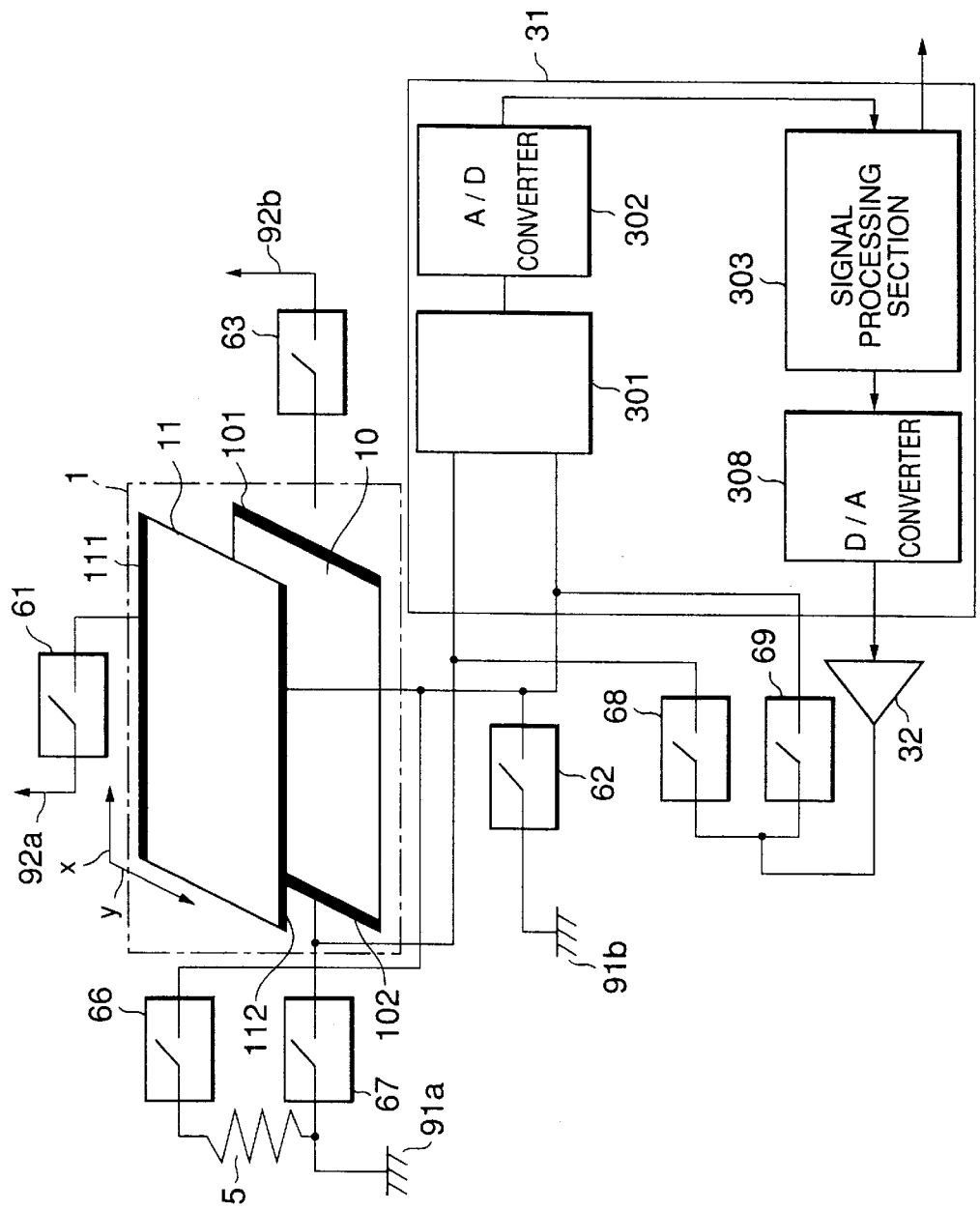
FIG. 5 is a block diagram for showing more specific constitution of the resistance film tablet system according to the preferred embodiment of the present invention.

Referring to FIG. 5, description is further made about the operations of the resistance film tablet system according to the preferred embodiment. FIG. 5 is a block diagram for showing a resistance film tablet system of the preferred embodiment of the present invention. Especially, an example is shown wherein an A/D converter, a D/A converter, and a signal processing section are integrated in one-chip microcomputer.

In FIG. 5, the input section 1 of the resistance film tablet system on which user actually performs input operation comprises a resistance film 10 with the parallel electrodes 101, 102 and a resistance film 11 with the parallel electrodes 111, 112 which are superposed on each other. These resistance films face each other with their directions shifted 90 degrees apart. When the resistance films 10, 11 are pressed externally by a stylus like a pen, they are brought into contact at a point, and the contact point has a gap of a level permitting to be conductive.

In the same Figure, one-chip microcomputer 31 is composed of an input switching device 301, an A/D converter 302, a signal processing section 303, and a D/A converter 308.

The input switching device 301 changes over the voltages of the resistance films 10, 11 of the tablet input section 1 and sends them to the A/D converter. The A/D converter 302 converts position data as an analog voltage outputted from the tablet input section 1 as a voltage into a form usable as digital data.

The signal processing section 303 is composed of a CPU core and a memory. This signal processing section 303 controls ON-OFF the electronic switches 61 to 63 and 66 to 69 individually based on the data outputted from the A/D converter 302. In addition, the signal processing section 303 operates a selective control in the input switching device 801 as necessary. Further, the signal processing section 303 changes an operation mode of the tablet input section 1, and calculates contact position data of the tablet input section 1 based on the data outputted from the A/D converter as the result of the change in the operation mode. These calculated data are outputted as measured data 7.

Moreover, the D/A converter 308 outputting a voltage supplied to the tablet input section 1 is also controllable. The D/A converter 308 converts the digital data designated by the signal processing section 303 into a form of an analog voltage for an output. A buffer amplifier 32 outputs a same voltage as the D/A converter 308 even with a low resistance load.

The contact detection resistor 5 is used for making the resistance film 11, which is connected with the A/D converter 302 for a contact detection when the tablet input section 1 is changed from the operation mode to contact detection mode, to be of a same potential as the ground for grounding. The electronic switches 61 to 63 and 66 to 69 are controlled by the signal processing section 303, and the connections of the terminal part connected with both ends are controlled ON-OFF.

The states of the connections will be hereinunder described more specifically.

The electronic switch 61 can connect the parallel electrode 111 of the resistance film 11 to the power source 92 for the tablet input section. The electronic switch 62 can connect the parallel electrode 112 of the resistance film 11 to the ground 91 for grounding the tablet input section 11.

The electronic switch 63 can connect the parallel electrode 101 of the resistance film 10 with the power source 92b for the tablet input section 1. The electronic switch 66 can connect the parallel electrode 112 of the resistance film 11 with the contact detection resistor 5.

The electronic switch 67 can connect the parallel electrode 102 of the resistance film 10 with the ground for grounding 91a the tablet input section 1. The electronic switch 68 can connect an output of the buffer amplifier 32 with the parallel electrode 102 of the resistance film 10. The electronic switch 69 can connect an output of the buffer amplifier 32 with the parallel electrode 112 of the resistance film 11.

The grounds 91a and 91b are those for grounding the tablet input section 1, The power supplies 92a and 92b are those supplied to the tablet input section 1.

This embodiment has a configuration wherein the D/A converter outputting the previously measured value in the same mode and electronic switches for connecting the D/A converter with the parallel electrodes of the tablet connected with an A/D converter are added to an ordinary tablet of resistance film system. Further, this embodiment is provided with additional scanning modes of "X-output" and "Y-output" for outputting the previously measured value.

Therefore, in this embodiment, fundamental scanning such as "contact detection" for checking a contact between two resistance films, "X-detection" for checking a position in the direction of X, and "Y-direction" for checking a position in the direction of Y are operated sequentially. And, the scanning is stopped when the two resistance films are judged in the "X-detection" as being not in contact with each other.

On the other hand, if the resistance films are judged as being in contact, the following operations are performed. Namely, "X-output" outputting the measured value of the previous X-detection, "X-detection", "Y-output" outputting the measured value of the previous "Y-detection", and "Y-detection" are sequentially operated. And then, "contact detection" is repeated until the contact is lost. Further, the example of the operation shown in FIG. 4 is the one wherein the resistance films were judged as contact was lost at the second contact detection.

Next, referring to FIG. 5, description proceeds to a more specific details of the embodiment of the resistance film tablet system of the present invention with reference to FIG. 4 continued.

The tablet input section in FIG. 5 is, specifically, the one comprising two resistance films 10, 11 superposed on each other and spaced by a predetermined distance therebetween. In addition, the resistance film 10 is provided with the parallel electrodes 101 and 102 while the resistance film 11 is provided with the parallel electrodes 111 and 112. When the resistance films thus superposed are externally pressed with a stylus like a pen, the resistance films come into contact at a point. The contact point between the resistance films passes a current.

Each parallel electrode in the same Figure is arranged so as to be changed in the connection to be routed to by means of the electronic switches 61 to 63 and 66 to 69. The parallel electrode 101 is connectable with the power supply 92 by the electronic switch 63. The parallel electrode 102 is connectable with the ground 91a and the input side of the input switching device 301, and is also independently connectable with the output side of the buffer amplifier 32.

The parallel electrode 111 is connectable with the power supply 92a. The parallel electrode 112 is connectable not only with the ground 91b and the input side of the input switching device 301 but also with the contact detection resistor 5 and the output side of the buffer amplifier 32.

Next, states of the parallel electrodes in each detection mode will be described hereinunder.

In the contact detection, the parallel electrode 101 is connected with the power supply 92b; the parallel electrodes 101, 102 are non-connective; and the parallel electrode 112 is connected with the A/D converter 302 through the contact detection resister 5 and the input switching device 301.

In the X-detection, the parallel electrode 101 is connected with the power supply 92b; the parallel electrode 111 is non-connective; and the parallel electrode 112 is connected with the A/D converter 302 through the input switching device 301.

In the Y-detection, the parallel electrode 101 is non-connective; the parallel electrode 102 is connected with the A/D converter 302 through the input switching device 301, the parallel electrode 111 is connected with the power supply 92a; and the parallel electrode 112 is connected with the ground 91a.

In the X-detection, the parallel electrode 101 is connected with the power supply 92b; the parallel electrode 102 is connected with the ground 91a; the parallel electrode 111 is non-connective; and the parallel electrode 112 is connected with the A/D converter 302 and the buffer amplifier 32 through the input switching device 301.

In the Y-detection, the parallel electrode 101 id non-connective; the parallel electrode 102 is connected with the A/D converter 302 and the buffer amplifier 32 through the input switching device 301; the parallel electrode 111 is connected with the power supply 92a; and the parallel electrode 112 is connected with the ground 91a.

Next, operation of the tablet will be described below referring to FIG. 4.

In the same Figure, the first contact detection, the X-detection, and the Y-detection do not differ from those in the case of the conventional example described above. If a contact is ascertained at the second contact detection, the signal processing section 803 goes to the X-output mode, as depicted by a point G in FIG. 4, and the D/A converter 308 provides the previously measured voltage value to the resistance film 11 connected with the side of the A/D converter 302 having a capacitance for charging the capacitance portion.

Then, the signal processing section 303 operates the X-detection, as depicted by a point H in FIG. 4, and after the voltage value of the resistance film 11 has converged, the A/D converter 302 measures the voltage value of the resistance film 11.

Here, unlike the case of the conventional example, the voltage value reaches an intended convergent value starting from the previously measured value. Here, a speed of response required for an ordinary tablet is as fast as a moving speed of an operator's hand. Thus, since there is little difference in the result between the previous measurement and the present measurement, the convergent time shown by arrows in FIG. 4 is shorten.

And then, the signal processing section 303 interchanges the connections of the resistance films and similarly operates the Y-output before operating the Y-detection and the contact detection. If a contact is ascertained by this contact detection, scanning is re-started from the X-output.

In short, the resistance film tablet system in accordance with the present invention employs the following control method. Namely, the tablet is controlled in order of "contact detection" checking a contact between the resistance films, "X-output" outputting the measured value of the previous X-detection in response to the contact detection, "X-detection" checking thereafter a position in the direction of X, "Y-output" outputting a value of the previous Y-detection in response to the X-detection, and "Y-detection" checking thereafter a position in the direction of Y. And, a program for achieving this control method is stored in the signal processing section 303 and the program is executed.

Figure 6:
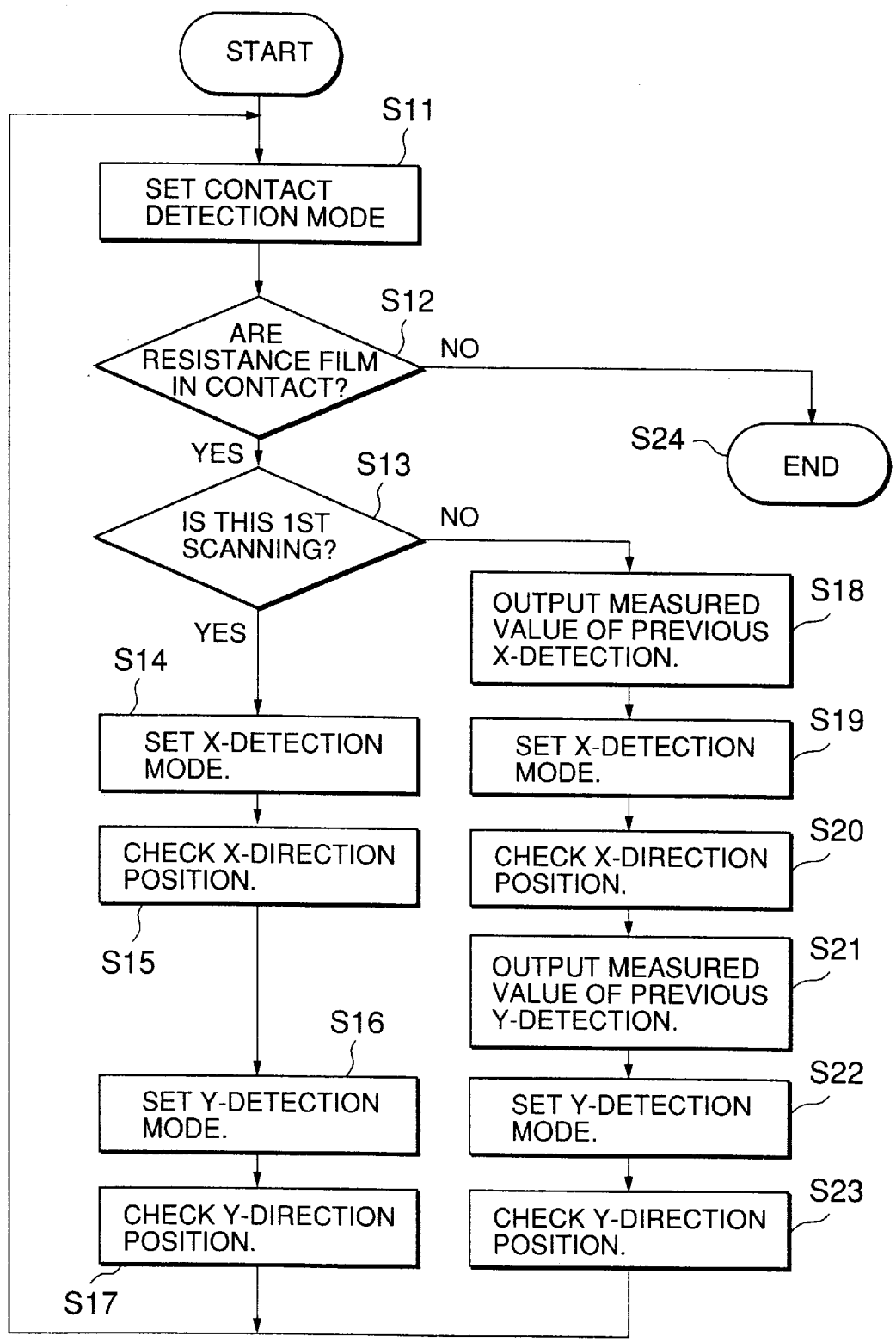
FIG. 6 is a flow chart for showing a method of controlling the resistance film tablet system according to the preferred embodiment of the present invention.

Referring to FIG. 6, description is made as regards the program for achieving the control method. As shown in FIG. 6, a touch panel is firstly set to contact detection mode (step S11). After this setting, the program judges whether the resistance films are in contact with each other, if they are not in contact, the processing is ended (step S12→S24). On the other hand, if they are in contact, scanning is judged whether it is the first one or thereafter (step S12→S13), and the processing is changed.

In the case of the first scanning, the touch panel is set to the X-detection mode (step S14) for checking an X-direction position (step S15). Next, the touch panel is set to the Y-detection position (step S16), a Y-direction position is checked (step S17). And then, the processing returns to step S11 (step S17→S11) in order to judge whether or not the resistance films are in contact with each other.

When the scanning is the second one or later, the measured value of the previous X-detection is outputted to the touch panel (step S13→S18). And, the touch panel is set to X-detection mode (step S19) for checking the Y-direction position (step S20).

And then, the value of the previous Y-detection is outputted to the touch panel (step S21). And, the touch panel is set to the Y-detection mode (step S22) for checking the Y-direction position (step S28). And then, the processing returns to that at step S11 (step S23→S11) in order to judge whether or not the resistance films are in contact with each other. After this, the above operations are repeated, and the operation is ended (step S12→S24) if the resistance films are not in contact with each other.

Moreover, it is obvious that the same operations as described above are possible if each part in FIG. 3 or FIG. 5 is controlled by preparing and using a recording medium on which a program for achieving the above-described control method is recorded. For this recording medium, semiconductor memory, magnetic disk device, which are not shown in both Figures, and other various recording media are applicable.

It is also obvious that similar operations to the above are possible through a computer control by means of the program recorded on the recording media. For this recording medium, semiconductor memory, magnetic disk device, and other various recording media are applicable.

As described above, the present invention has such an advantage that when a voltage of a contact point is measured by X-detection and Y-detection, a faster sampling can be operated by charging a capacitance portion of the resistance films with the previously measured value, reducing the capacitance portion to its convergent value faster, and shortening a waiting time after a mode setting by the signal processing section.

While the present invention has thus far been described in conjunction with a preferred embodiment thereof, it will be readily possible for those skilled in the art to put the present invention into various other manners.

For example, a resistance film tablet system of the present invention may be characterized in that the two resistance films are both rectangular resistance films with uniform resistance value and are constituted so as to be superposed on each other with parallel electrodes provided on the opposing sides of the rectangles mutually shifted by 90 degrees.

Further, a resistance film tablet system of the present invention may be characterized in that the two resistance films are both rectangular resistance films with uniform resistance value and a first direction is along one side of the rectangle and a second direction is along the other side of the rectangle.

On the other hand, a method of controlling a resistance film tablet system of the present invention may be characterized in that the two resistance films are both rectangular resistance films with uniform resistance value and are constituted so as to be superposed on each other with parallel electrodes provided on the opposing sides of the rectangles mutually shifted by 90 degrees.

Moreover, a method of controlling a resistance film tablet system of the present invention may be characterized in that the two resistance films are both rectangular resistance films with uniform resistance value and a first direction is along one side of the rectangle and a second direction is along the other side of the rectangle.

What is claimed is:

1. A resistance film tablet system which includes a pair of resistance films superposed on each other and spaced by a predetermined distance therebetween, comprising:
    contact detection means for detecting that said a pair of resistance films are in contact with each other at a contact point;
    charging means for charging a capacitance between said a pair of resistance films in response to the detection; and
    detection means for detecting a position in a first direction and a position in a second direction orthogonal to said first direction regarding the contact point of said a pair of resistance films after the charging.

2. A resistance film tablet system as claimed in claim 1, wherein said a pair of resistance films are both rectangular resistance films with uniform resistance value and are constituted so as to be superposed on each other with parallel electrodes provided on the opposing sides of the rectangles mutually shifted by 90 degrees.

3. A resistance film tablet system as claimed in claim 1, wherein said a pair of resistance films are both rectangular resistance films with uniform resistance value and said first direction is along one side of the rectangle and said second direction is along the other side of the rectangle.

4. A resistance film tablet system as claimed in claim 1, wherein said charging means comprise a memory for storing position data regarding the position in said first direction and the position in said second direction detected by said detection means, and voltage impression means for impressing a voltage corresponding to the position data stored in said memory across said a pair of resistance films.

5. A resistance film tablet system as claimed in claim 4, wherein said position data are stored in said memory after converting them into digital data.

6. A resistance film tablet system as claimed in claim 4, wherein said charging means charge the capacitance in accordance with a signal after the data read from the memory has been transformed into analog data.

7. A method of controlling a resistance film tablet system composed of a pair of resistance films superposed on each other and spaced by a predetermined distance therebetween, comprising the steps of;

detecting a contact state between said a pair of resistance films;

charging a capacitance between said a pair of resistance films in response to the detection of said contact state; and detecting a position in a first direction and a position in a second direction orthogonal to said first direction regarding the contact point of said a pair of resistance films after the charging.

8. A method of controlling a resistance film tablet system as claimed in claim 7, wherein said a pair of resistance films are both rectangular resistance films with uniform resistance value and are constituted so as to be superposed on each other with parallel electrodes provided on the opposing sides of the rectangles mutually shifted by 90 degrees.

9. A method of controlling a resistance film tablet system as claimed in claim 7, wherein said a pair of resistance films are both rectangular resistance films with uniform resistance value and said first direction is along one side of the rectangle and said second direction is along the other side of the rectangle.

10. A method of controlling a resistance film tablet system as claimed in claim 7, wherein said charging step comprises a step of impressing a voltage corresponding to the position data stored in said memory storing the position data regarding the position in said first direction and the position in said second direction detected by said position detection step between said a pair of resistance films.

11. A recording medium for storing a computer program to achieve a method of controlling a resistance film tablet system composed of a pair of resistance films superposed on each other and spaced by a predetermined distance therebetween, wherein said computer program makes a computer detect a contact state between said a pair of resistance films, and charge a capacitance between said a pair of resistance films in response to the detection of a contact state, and detect a position in a first direction and a position in a second direction orthogonal to said first direction regarding the contact point of said a pair of resistance films after the charging.

* * * * *